Nov. 3, 1970     J. J. RAPUZZI     3,537,300
PRECISION GUIDE FOR ULTRASONIC TRANSDUCER
Filed Sept. 25, 1968
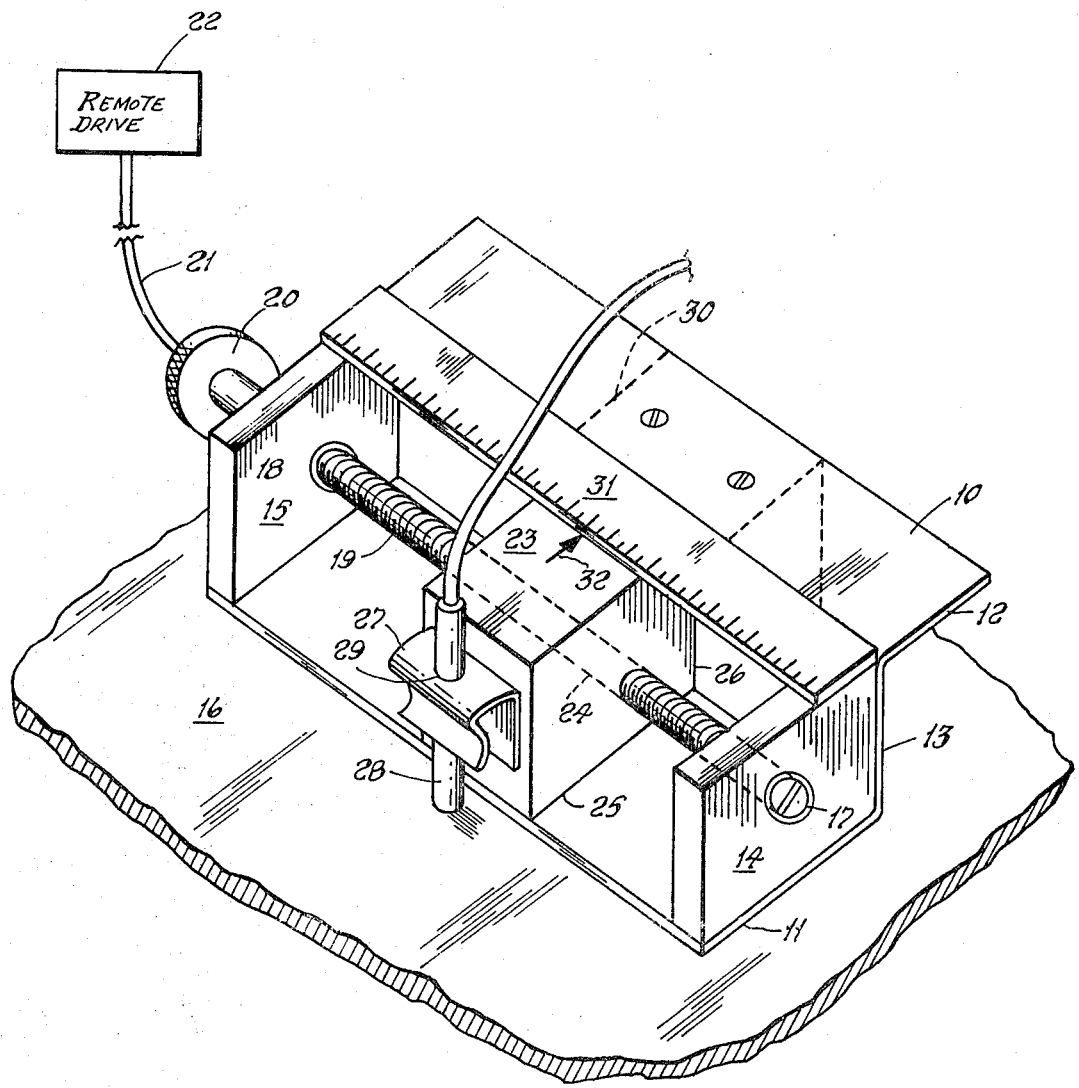
INVENTOR.
JOHN J. RAPUZZI
BY Ernest J. Weinberger
Louis B. Appleton
ATTORNEYS United States Patent Office 3,537,300
Patented Nov. 3, 1970

3,537,300
PRECISION GUIDE FOR ULTRASONIC TRANSDUCER
John J. Rapuzzi, Queens Village, N.Y., assignor to the United States of America as represented by the Secretary of the Navy
Filed Sept. 25, 1968, Ser. No. 762,472
Int. Cl. G01n 29/04; H04r 17/00
U.S. Cl. 73—71.5                             5 Claims

ABSTRACT OF THE DISCLOSURE

A precision linear guide including a Z cross-sectionally shaped bar member having at one set of ends support blocks which rotatably support therebetween a lead screw. A carrier having a threaded passageway therethrough is mounted on the lead screw and supports a biased transducer holder, whereby rotation of the screw causes the carrier and a mounted transducer to linearly traverse the surface of a specimen on which the guide is placed.

---

The invention described herein may be manufactured and used by or for the Government of the United States of America for governmental purposes without the payment of any royalties thereon or therefor.

BACKGROUND OF THE INVENTION

Field of the invention

The present invention relates to a mechanical guide, and more particularly pertains to a precision guide for an ultrasonic transducer for providing linear motion thereof on a specimen.

Description of the prior art

In the field of transducer guidance it has been the general practice to employ relatively complex mechanical structures to guide transducer probes. Such devices, under certain conditions, have been unsatisfactory in that they require skilled operation, and are not portable so that, where large specimens are to be evaluated, these prior art devices are inadequate.

SUMMARY OF THE INVENTION

The general purpose of this invention is to provide a precision linear guide that has all the advantages of similarly employed prior art devices and has none of the above-described disadvantages. To attain this, the present invention provides a unique Z cross-sectionally shaped bar which supports a lead screw on which rides a transducer probe carrier. A permanent magnet secures the whole structure to the specimen whereby, as the lead screw is rotated manually or is motor driven, the carrier moves in a precise linear manner.

An object of this invention is to provide a device for automatically and precisely moving and guiding a transducer probe along the surface of a specimen.

Another object is to provide a relatively simple, inexpensive, portable transducer probe guide that can be operated either manually or automatically.

Other objects, advantages and novel features of the invention will become apparent from the following detailed description of the invention when considered in conjunction with the accompanying drawings wherein the figure in the drawing is a perspective view of a precision guidance structure for a transducer made in accordance with the principles of this invention.

DESCRIPTION OF THE PREFERRED EMBODIMENT

In the embodiment of FIG. 1, a bar member 10 which is Z shaped in cross-section and includes a pair of extending arms 11 and 12 joined by a central arm 13, which all extend lengthwise, supports between its ends a pair of support blocks 14 and 15. The bar member is disposed on a specimen 16 with one of the arms 11 in abutting relation therewith. Each of the support blocks are provided with bearing passages 17 and 18 therethrough for rotatably supporting therebetween lead screw 19 which extends outwardly of block 15 and terminates at a knurled wheel 20 for manual rotation of the lead screw. A flexible shaft 21 is affixed to the wheel 20 which may be driven by an automatic remote drive system 22.

A carrier 23 which may be in the form of a simple block is provided with a threaded passage 24 and whose threads mate with those of the lead screw 19 and through which the screw 19 passes. The carrier can be provided with a means to prevent rotation thereof. The simplest expedient being, as illustrated, two peripheral walls 25 and 26 of the carrier slidingly abutting the arm 11 and central arm 13 of the Z bar member 10. This arrangement permits the carrier to move rectilinearly lengthwise along the lead screw as the screw is rotated. The carrier supports a flexible resilient holder 27 which is biased to provide surface contact between the transducer probe 28 and the specimen 16 on which the guide rests. The probe 28 is supported and held by the holder 23 by any suitable means as for example, passageway 29.

Although the guide could be sufficiently weighted so that is would be relatively fixed on the specimen surface it is preferable to secure the guide by some other means. A permanent magnet 30 is affixed to either arm 12 or 13 and has its lower end in contact with the specimen which is generally of a magnetic or paramagnetic material. A linear scale 31 in conjunction with the marking 32 on the upper surface of the carrier permits the operator to ascertain the relative position of the probe at any time.

Obviously many modifications and variations of the present invention are possible in the light of the above teachings. It is therefore to be understood that within the scope of the appended claims the invention may be practiced otherwise than as specifically described.

I claim:
1. A precision guide for providing physical contact between a transducer and selected areas of a specimen, which comprises:
   an extended, cross-sectionally Z-shaped bar member having a pair of extending arms and a central arm therebetween,
   support means affixed at opposite ends of said bar member,
   a carrier having a threaded passage therethrough,
   a lead screw supported by and between said support means for free rotation therein and passing through and mating with said threaded passage, said carrier abutting said bar member for preventing rotation of said carrier, biasing holder means supported on said carrier for resiliently holding a transducer probe in contact with a specimen surface on which said guide is placed, means for releasably securing said guide to said specimen surface, and drive means attached to and for rotating said lead screw whereby said transducer will be linearly moved along and in contact with said specimen surface.

2. The guide according to claim 1 wherein said carrier is formed with at least two corner faces, one abutting one of said extending arms and the other abutting said central arm.

3. The guide according to claim 2 wherein said means for releaseably securing is a permanent magnet affixed to the other of said extending arms.

4. The guide according to claim 3 wherein said drive means includes a flexible shaft affixed to one end of said screw and motor means for rotating said flexible shaft.

5. The guide according to claim 4 further including a scale affixed to said guide for indicating the position of said carrier relative thereto.

References Cited
UNITED STATES PATENTS

| | | | |
|---|---|---|---|
| 2,660,054 | 11/1953 | Pringle | 73—67.7 |
| 3,178,933 | 4/1965 | Bloch | 73—67.8 |

RICHARD C. QUEISSER, Primary Examiner

J. P. BEAUCHAMP, Assistant Examiner

U.S. Cl. X.R.

73—67.8